(12) United States Patent
Chongfuangprinya et al.

(10) Patent No.: US 11,455,696 B2
(45) Date of Patent: Sep. 27, 2022

(54) MULTI-LAYER HYBRID MODEL POWER GENERATION PREDICTION METHOD AND COMPUTING SYSTEM

(71) Applicant: Hitachi, Ltd., Tokyo (JP)

(72) Inventors: Panitarn Chongfuangprinya, San Jose, CA (US); Bo Yang, Santa Clara, CA (US); Yanzhu Ye, San Jose, CA (US); Masanori Abe, Santa Clara, CA (US); Jian Gao, Chino, CA (US)

(73) Assignee: HITACHI, LTD., Tokyo (JP)

( * ) Notice: Subject to any disclaimer, the term of this patent is extended or adjusted under 35 U.S.C. 154(b) by 225 days.

(21) Appl. No.: 16/818,177

(22) Filed: Mar. 13, 2020

(65) Prior Publication Data

US 2021/0287310 A1    Sep. 16, 2021

(51) Int. Cl.
*G06Q 50/06* (2012.01)
*G06N 20/00* (2019.01)
*G06N 3/08* (2006.01)

(52) U.S. Cl.
CPC ............ *G06Q 50/06* (2013.01); *G06N 3/082* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,460,478 B2 | 10/2016 | Zhang et al. | |
| 9,460,748 B2* | 10/2016 | Mimura | G11B 7/005 |
| 2010/0114663 A1* | 5/2010 | Casas | G06F 16/902 |
| | | | 705/7.31 |
| 2017/0286838 A1* | 10/2017 | Cipriani | G06N 20/00 |
| 2018/0223814 A1* | 8/2018 | Badrinath Krishna | G06N 3/04 |
| 2020/0057175 A1* | 2/2020 | Zhang | H02J 3/004 |
| 2021/0125065 A1* | 4/2021 | Turcot | G06N 3/084 |
| 2021/0264199 A1* | 8/2021 | Walters | G06K 9/6262 |

OTHER PUBLICATIONS

Ju et al., "A Model Combining Convolutional Neural Network and LightGBM Algorithm for Ultra-Short-Term Wind Power Forecasting," IEEE, 2019, 10pg. (Year: 2019).*

Zang et al., "Hybrid method for short-term photovoltaic power forecasting based on deep convolutional neural network," IET, 2018, 11 pg. (Year: 2018).*

* cited by examiner

*Primary Examiner* — Ryan D. Coyer
(74) *Attorney, Agent, or Firm* — Procopio, Cory, Hargreaves & Savitch LLP

(57) ABSTRACT

Example implementations described herein involve a multi-layer hybrid model power generation prediction method and computing system. The example implementations described herein are configured to predict power generation that can be utilized for short-term planning by utilities to optimize operation planning to ensure economic and stable operation of the electricity.

11 Claims, 16 Drawing Sheets

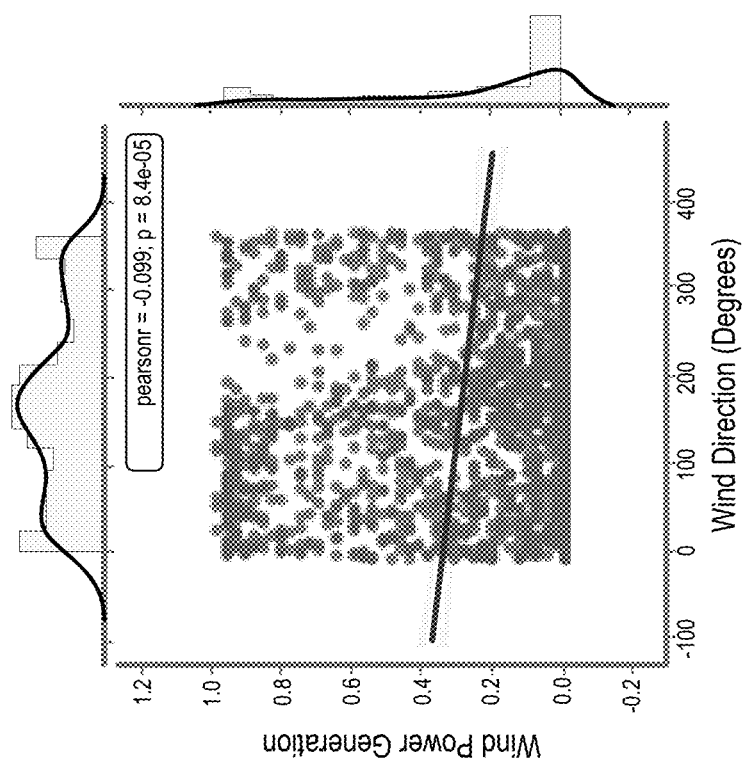
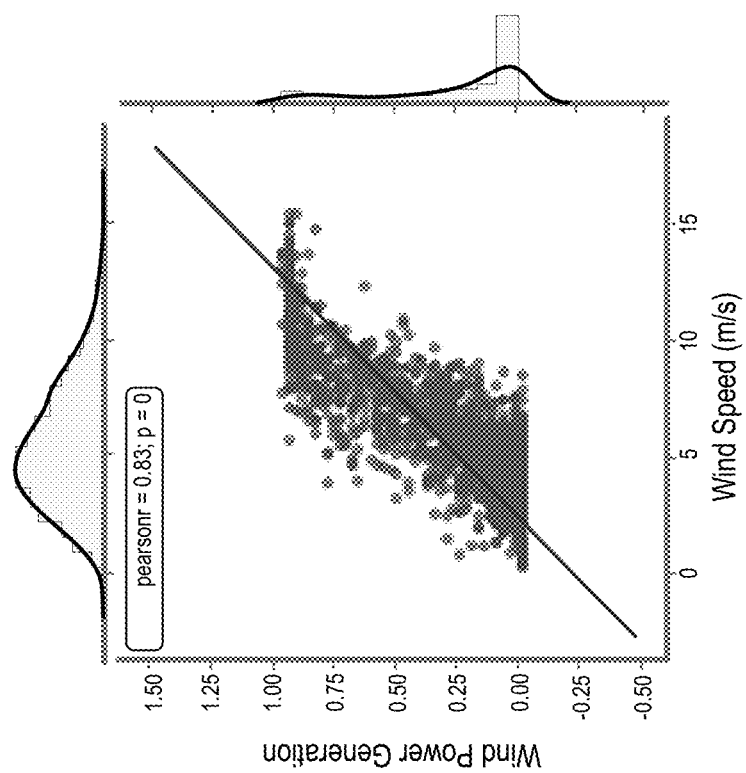
FIG. 3(a)
FIG. 3(b)

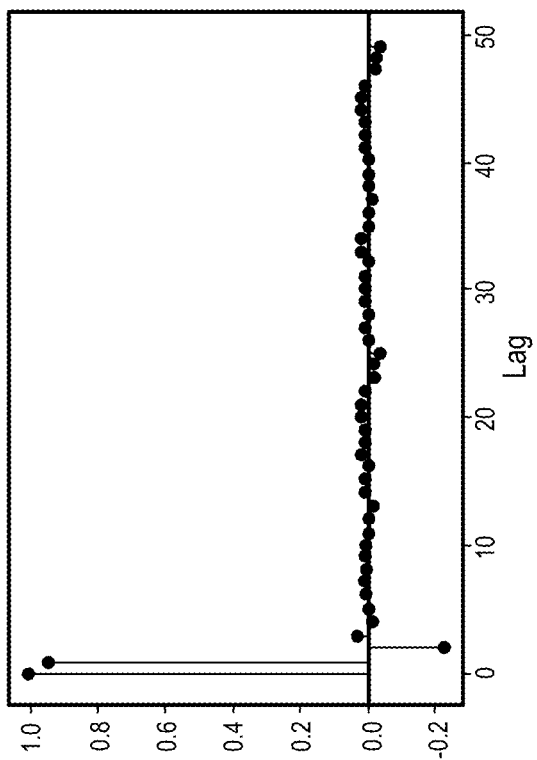
FIG. 5(a)
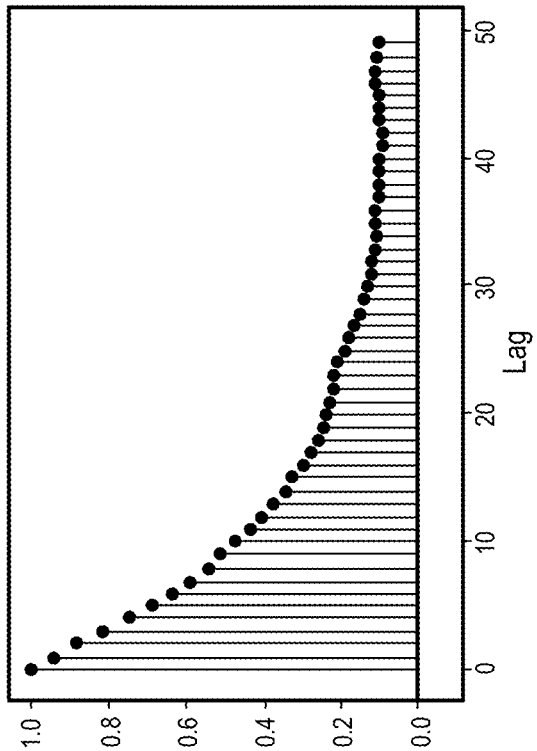
FIG. 5(b)
| Autocorrelation | t-1 | t | t+1 |
|---|---|---|---|
| t-1 | 1 | 0.95 | 0.88 |
| t | 0.95 | 1 | 0.95 |
| t+1 | 0.88 | 0.95 | 1 |
FIG. 5(c)

|            | Turbine 1 | Turbine 2 | Turbine 3 | Turbine 4 | Turbine 5 | Turbine 6 | Turbine 7 | Turbine 8 | Turbine 9 | Turbine 10 |
|------------|-----------|-----------|-----------|-----------|-----------|-----------|-----------|-----------|-----------|------------|
| Turbine 1  | 1.00      | 0.42      | 0.63      | 0.73      | 0.62      | 0.74      | 0.65      | 0.52      | 0.43      | 0.63       |
| Turbine 2  | 0.42      | 1.00      | 0.40      | 0.50      | 0.25      | 0.45      | 0.56      | 0.43      | 0.44      | 0.61       |
| Turbine 3  | 0.63      | 0.40      | 1.00      | 0.66      | 0.42      | 0.62      | 0.69      | 0.51      | 0.62      | 0.33       |
| Turbine 4  | 0.73      | 0.50      | 0.66      | 1.00      | 0.50      | 0.92      | 0.89      | 0.63      | 0.41      | 0.53       |
| Turbine 5  | 0.62      | 0.25      | 0.42      | 0.50      | 1.00      | 0.53      | 0.52      | 0.51      | 0.61      | 0.56       |
| Turbine 6  | 0.74      | 0.45      | 0.62      | 0.92      | 0.53      | 1.00      | 0.95      | 0.73      | 0.43      | 0.56       |
| Turbine 7  | 0.65      | 0.56      | 0.69      | 0.89      | 0.52      | 0.95      | 1.00      | 0.63      | 0.48      | 0.71       |
| Turbine 8  | 0.52      | 0.43      | 0.51      | 0.63      | 0.51      | 0.73      | 0.63      | 1.00      | 0.48      | 0.39       |
| Turbine 9  | 0.43      | 0.44      | 0.62      | 0.41      | 0.61      | 0.43      | 0.48      | 0.48      | 1.00      | 0.63       |
| Turbine 10 | 0.63      | 0.61      | 0.33      | 0.53      | 0.56      | 0.56      | 0.71      | 0.39      | 0.63      | 1.00       |

FIG. 6

| Feature | Description | Type | Range |
|---|---|---|---|
| ws | Wind speed | float | [0,1] |
| wind | layer 1 prediction | float | [0,1] |
| p1, p2, p3, p4 | lag of wind | float | [0,1] |
| month | month | int | [0,12] |
| year | year | int | [2014,...,2018] |
| hour | hour in a day | int | [0,23] |
| day | date difference to July 15 | int | [0,195] |
| dist | prediction horizon | int | [1,48] |
| h1, h2, h3, h4 | historical feature | float | [0,1] |
| cluster | cluster from k-mean algorithm | int | [1,20] |
| wdc8 | 8 categorical wind direction | categorical | {0,1,...,7} |
| wdc12 | 12 categorical wind direction | categorical | {0,1,...,11} |
| r1 | recursive feature | float | [0,1] |
| hybrid1, hybrid2, hybrid3 | layer 3 prediction | float | [0,1] |

FIG. 9

| Layer 2 Model | Model Structures |
|---|---|
| 001 | wp ~ ws + wind + month + hour + year + day + p4 + p3 + p2 + p1 + dist |
| 002 | wp ~ ws + wind + month + hour + year + day + p4 + p3 + p2 + p1 + dist + h1 + h2 |
| 003 | wp ~ wind + month + hour + year + day + cluster |
| 004 | wp ~ wind + month + hour + year + day + cluster + dist |
| 005 | wp ~ ws + wind + month + hour + year + day + p4 + p3 + p2 + p1 + dist + wd_c12 |
| 006 | wp ~ ws + wind + month + hour + year + day + p4 + p3 + p2 + p1 + dist + wd_c12 |
| 007 | wp ~ ws + wind + month + hour + year + day + p4 + p3 + p2 + p1 + dist + wd_c12 |
| 008 | wp ~ ws + wind + month + hour + year + day + p4 + p3 + p2 + p1 + dist + h1 + h2 |
| 009 | wp ~ ws + wind + month + hour + year + day + p4 + p3 + p2 + p1 + dist + h1 + h2 + h3 + h4 |
| 010 | wp ~ ws + wind + month + hour + year + day + p4 + p3 + p2 + p1 + dist + h1 + h2 + h3 + h4 + r1 |

FIG. 10

MULTI-LAYER HYBRID MODEL POWER GENERATION PREDICTION METHOD AND COMPUTING SYSTEM

BACKGROUND

Field

The present disclosure is generally directed to methods and computing systems, and more specifically, to generation and applying a hybrid model for power generation prediction.

Related Art

Renewable energy resources such as wind farms and solar energy have grown to be a major asset in the global electricity market over the past decades, due to several factors such as a clean form of energy, regulation, incentives, and cost. Many countries have launched projects for large-scale integration of renewable energy resources into their grids. However, the increasing integration of wind and solar power generation may lead to potential challenges and impacts on planning and operations of power systems to maintain the stability of electric power operation because of the intermittent nature and high variability of wind power generation.

SUMMARY

A robust and accurate wind power prediction can support integration of renewable energy resources generation into the conventional power system and satisfy the grid code to provide economic and stable operation of the electricity.

Example implementations described herein involve a multi-layer hybrid model power generation prediction method and computing system. The example implementations described herein provide predictions of power generation that can be utilized for short-term planning by utilities facing challenges from the intermittent nature and high variability of renewable power generation. Such example implementations can be utilized to optimize operation planning to ensure economic and stable operation of the electricity. Examples of short-term planning can involve less than three days ahead. Examples of outputs can include 72 hourly predictions of wind power generation for the next three days.

The example implementations are in contrast to related art implementations which do not utilize multi-layer hybrid model approach. Through the multi-layer hybrid model approach, the example implementations can offer significant improvement over the related art approach by combining multiple models built from different characteristics into a single model to reduce the bias and variance of the prediction result.

The example implementations described herein facilitate a method and computing system to address the challenges of the related art by creating multiple layers of prediction models, in which each layer takes the output of the previous layer as part of features, and produce its own predictions, then combines multiple models to provide the final prediction result in the last layer. For example, the proposed method and computing system may create a single layer 1 prediction model; utilize prediction output from a layer 1 model as a feature as part of or all of multiple layer 2 prediction models; and integrate prediction output from multiple layer 2 models into a single layer 3 prediction model. A layer 3 hybrid prediction model offers improvement over a single model because it combines different characteristics from multiple models targeting at different aspects of knowledge to reduces the bias and variance of the prediction result.

Example implementations of the proposed system can include receiving, processing, and extracting features from historical data; creating layer 1 prediction model; creating multiple layer 2 prediction models based on extracted features, output of layer 1 model, output of layer 3 models, and additional extracted features; creating layer 3 hybrid prediction model based on output of a selection of layer 2 models; alternatively, creating multiple layer 3 hybrid prediction models based on different combination of selected layer 2 models and provide output back to create additional layer 2 models; and executing a layer 3 hybrid prediction model based on new data to provide prediction of the wind power generation that can be utilized for economic and stable operation of the electricity.

Example implementations of the proposed system can include: creating, training, and deploying models based on historical data; receiving new data; retraining and deploying existing models based on all data; receiving new data; and recreating, training, and deploying new models based on all data.

In addition, the example implementations described herein are not limited to only wind generation prediction for electric utilities, but can be applicable to other type of prediction for other type of industries such as production for manufacturing or e-commerce depending on the desired implementation.

Aspects of the present disclosure involve a method for generating a multi-layer hybrid model power generation prediction, the method involving extracting features from historical data of one or more renewable energy systems and the one or more weather forecasts systems; generating a layer 1 prediction model from the extracted features; generating a plurality of layer 2 prediction models based on one or more of an output from the layer 1 prediction model, an output from layer 3 prediction models, and the extracted features; generating the at least one layer 3 hybrid prediction model based on an output of a selection of layer 2 prediction models from the plurality of layer 2 prediction models; and executing the at least one layer 3 hybrid prediction model on new data received from the one or more renewable energy systems and the one or more weather forecasts systems to provide prediction on power generation of the one or more renewable energy systems.

Aspects of the present disclosure involve a non-transitory computer readable medium, storing instructions for generating a multi-layer hybrid model power generation prediction, the instructions involving extracting features from historical data of one or more renewable energy systems and the one or more weather forecasts systems; generating a layer 1 prediction model from the extracted features; generating a plurality of layer 2 prediction models based on one or more of an output from the layer 1 prediction model, an output from layer 3 prediction models, and the extracted features; generating the at least one layer 3 hybrid prediction model based on an output of a selection of layer 2 prediction models from the plurality of layer 2 prediction models; and executing the at least one layer 3 hybrid prediction model on new data received from the one or more renewable energy systems and the one or more weather forecasts systems to provide prediction on power generation of the one or more renewable energy systems.

Aspects of the present disclosure involve a system for generating a multi-layer hybrid model power generation prediction, the system involving means for extracting features from historical data of one or more renewable energy systems and the one or more weather forecasts systems; means for generating a layer 1 prediction model from the extracted features; means for generating a plurality of layer 2 prediction models based on one or more of an output from the layer 1 prediction model, an output from layer 3 prediction models, and the extracted features; means for generating the at least one layer 3 hybrid prediction model based on an output of a selection of layer 2 prediction models from the plurality of layer 2 prediction models; and means for executing the at least one layer 3 hybrid prediction model on new data received from the one or more renewable energy systems and the one or more weather forecasts systems to provide prediction on power generation of the one or more renewable energy systems.

Aspects of the present disclosure involve a management apparatus involving a processor configured to extract features from historical data of one or more renewable energy systems and the one or more weather forecasts systems; generate a layer 1 prediction model from the extracted features; generate a plurality of layer 2 prediction models based on one or more of an output from the layer 1 prediction model, an output from layer 3 prediction models, and the extracted features; generate the at least one layer 3 hybrid prediction model based on an output of a selection of layer 2 prediction models from the plurality of layer 2 prediction models; and execute the at least one layer 3 hybrid prediction model on new data received from the one or more renewable energy systems and the one or more weather forecasts systems to provide prediction on power generation of the one or more renewable energy systems.

Aspects of the present disclosure involve an apparatus communicatively coupled to one or more renewable energy systems and the one or more weather forecasts systems, the apparatus involving a processor, configured to receive data from the one or more renewable energy systems and the one or more weather forecasts systems; extract features from the data from the one or more renewable energy systems and the one or more weather forecasts systems; execute a layer 1 prediction model on the extracted features to generate a first output; execute a plurality of layer 2 prediction models on the output from the layer 1 prediction model and the extracted features; provide output from the plurality of layer 2 prediction models to a layer 3 hybrid prediction model to provide prediction on power generation of the one or more renewable energy systems.

Aspects of the present disclosure involve a system communicatively coupled to one or more renewable energy systems and the one or more weather forecasts systems, the systems involving means for receiving data from the one or more renewable energy systems and the one or more weather forecasts systems; means for extracting features from the data from the one or more renewable energy systems and the one or more weather forecasts systems; means for executing a layer 1 prediction model on the extracted features to generate a first output; means for executing a plurality of layer 2 prediction models on the output from the layer 1 prediction model and the extracted features; and means for providing output from the plurality of layer 2 prediction models to a layer 3 hybrid prediction model to provide prediction on power generation of the one or more renewable energy systems.

Aspects of the present disclosure involve a method involving receiving data from the one or more renewable energy systems and the one or more weather forecasts systems; extracting features from the data from the one or more renewable energy systems and the one or more weather forecasts systems; executing a layer 1 prediction model on the extracted features to generate a first output; executing a plurality of layer 2 prediction models on the output from the layer 1 prediction model and the extracted features; and providing output from the plurality of layer 2 prediction models to a layer 3 hybrid prediction model to provide prediction on power generation of the one or more renewable energy systems.

BRIEF DESCRIPTION OF DRAWINGS

FIGS. 3(a) and 3(b) illustrate an example of the relationships of historical data, in accordance with an example implementation.

FIGS. 5(a) to 5(c) illustrate an example of the correlation of wind power generation time-series data, in accordance with an example implementation.

FIG. 6 illustrates an example of locational influences, in accordance with an example implementation.

FIG. 9 illustrates an example of extracted features and additional features according to an example implementation.

FIG. 10 illustrates ten examples of layer 2 models and associated features, in accordance with an example implementation.

DETAILED DESCRIPTION

Figure 1:
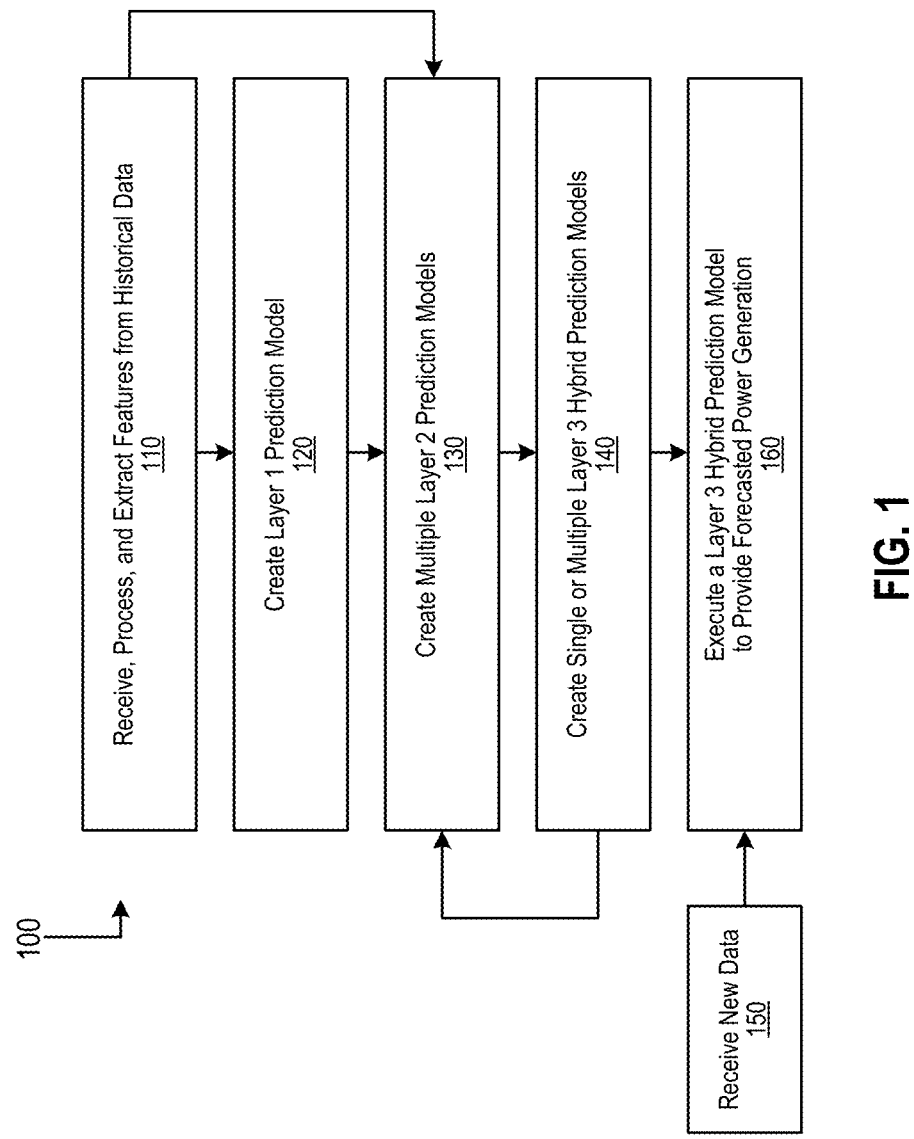
FIG. 1 is a flow diagram illustrating an example of a multi-layer hybrid model power generation prediction method and computing system at a high level according to an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 is a flow diagram illustrating an example of a multi-layer hybrid model power generation prediction method and computing system at high level according to an example implementation. The example implementation as illustrated in FIG. 1 provides predicted wind power generation in consideration of the historical data, and in which each layer takes the output of the previous layer as input and produces its own predictions. Example of historical data can include five years of hourly historical power generations data of a wind farm, and corresponding historical weather forecasts data of wind speed and direction. Example of outputs of the method and computing system can include 72 hourly predictions of total wind power generation for the next three days for a wind farm in which ten wind turbines are spread across 500 acres of land.

The method 100 includes receiving, processing, and extracting features from historical data at 110. For example, the historical data may include time, wind power generation, wind speed, wind direction, and location. Historical data may be time-series data, spatial data, temporal data, and/or spatial-temporal data. Extracted features may include supervised feature such as year, month, hour, wind speed in x-axis, wind speed in y-axis, categorical wind direction. Extracted features may include unsupervised features such as a cluster of wind power generation for each hour.

At 120, the method 100 proceeds in creating a layer 1 prediction model. For example, the layer 1 model may be a machine learning model that learns the wind power generation equation of wind turbines by mapping wind speed and wind direction data to a basic wind power generation. The output of the process of 120 can include predictions of hourly wind power generation which become a new feature "wind" and input into all models at 130.

At 130, the method 100 proceeds in creating multiple layer 2 prediction models based on extracted features from the process at 110 and the layer 1 model result from the process at 120. For example, the process at 130 may create hundreds of layer 2 models that learn from a different set of extracted features and output from the layer 1 model.

At 140, the method 100 proceeds in creating a single layer 3 hybrid prediction model to combine results from the process at 130. For example, the layer 3 prediction model may utilize a stacked regression method that forms a linear combination of selected ten layer 2 models.

Additionally, the process at 140 may create multiple layer 3 hybrid prediction models based on different combinations of selected layer 2 models, and provide output back to the process at 130. For example, the system may create five layer 3 models based on five combinations of different selection of layer 2 models. The outputs from five layer 3 models may be utilized as additional features to create additional layer 2 models.

At 160, the method 100 includes executing a layer 3 hybrid prediction model based on new data from the process at 150 to provide prediction of the wind power generation that can be utilized for economic and stable operation of the electricity.

Figure 2A:
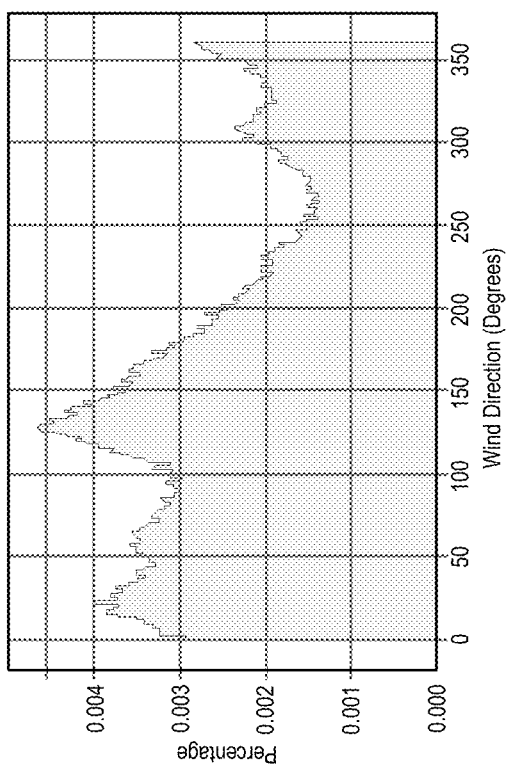
FIGS. 2(a) and 2(b) illustrate an example of the probability histograms of historical data, in accordance with an example implementation.
Figure 2B:
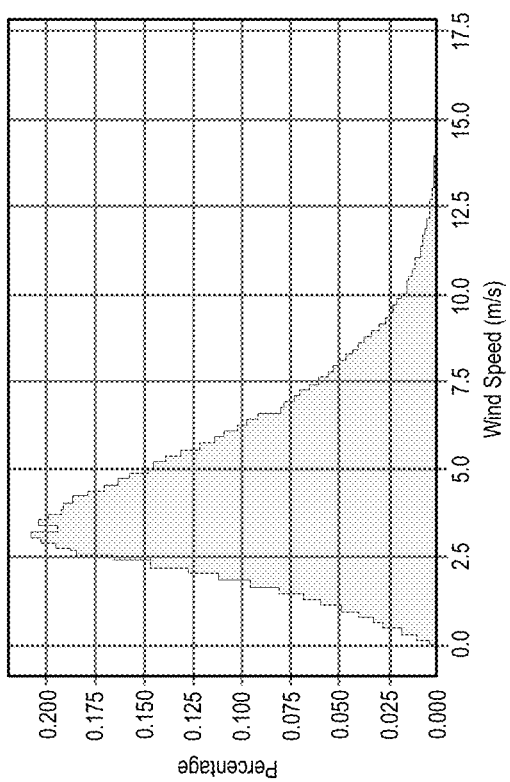

FIGS. 2(a) and 2(b) illustrate an example of the probability histograms of historical data for the method of FIG. 1, in accordance with an example implementation. This example includes the probability histogram of hourly wind speed as illustrated in FIG. 2(a) and the probability histogram of hourly wind direction as illustrated in FIG. 2(b). The mean wind speed is around 4.6 m/s and the maximum wind speed is around 15.0 m/s. Because the wind direction is not uniform in all directions, the system may extract and utilize wind direction as a categorical feature in the method illustrated in FIG. 1.

FIGS. 3(a) and 3(b) illustrate an example of the relationships of historical data in the method of FIG. 1, in accordance with an example implementation. This example includes the trend between wind speed and wind power generation as illustrated in FIG. 3(a). The trend of FIG. 3(a) demonstrates a strong linear relationship, so the system may build a layer 1 prediction model to learn the wind power generation equation in the process at 120. This example also includes the trend between wind direction and wind power generation at FIG. 3(b). The trend of FIG. 3(b) demonstrates a strong non-linear relationship, so the system may extract categorical feature from the process at 110 to represent wind direction, and utilize the variables in the process at 120 and 130.

Figure 4A:
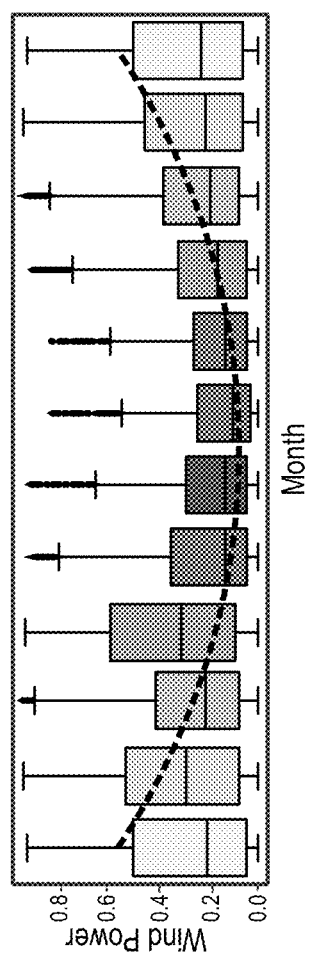
FIGS. 4(a) and 4(b) illustrates an example of the seasonality patterns of historical data, in accordance with an example implementation.
Figure 4B:
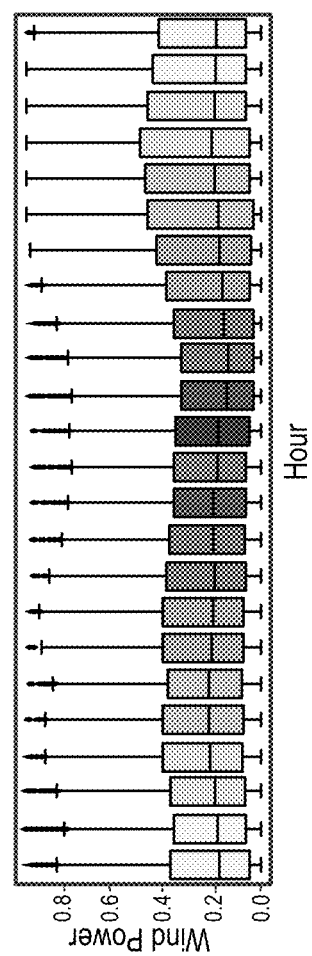

FIGS. 4(a) and 4(b) illustrate an example of the seasonality patterns of historical data in the method of FIG. 1, in accordance with an example implementation. This example includes the box-plot of monthly wind power generation as illustrated in FIG. 4(a) that shows obvious monthly seasonal patterns. The box-plot of FIG. 4(a) illustrates that the wind power generation has the lowest value around July 15 and shows symmetric patterns. This example also includes the box-plot of hourly wind power generation as illustrated in FIG. 4(b) that shows subtle hourly pattern throughout the day. The box-plot of FIG. 4(b) illustrates that the wind power generation has the highest in the evening of the day.

FIGS. 5(a) to 5(c) illustrate an example of the correlation of wind power generation time-series data, in accordance with an example implementation. This example includes the autocorrelation on wind power generation as illustrated in FIG. 5(a), and the partial autocorrelation on wind power generation as illustrated in FIG. 5(b). This example also includes the autocorrelation table of wind power generation as illustrated in FIG. 5(c). The autocorrelation table of FIG. 5(c) shows strong autocorrelation between t−1, t, and t+1 where t represents time interval.

FIG. 6 illustrates an example of locational influences, in accordance with an example implementation. The overall length of a wind farm may cover several miles. The location of wind turbines within a wind farm may have influence on wind power generation. Wind turbines located close to each other may have similar patterns. The system may extract unsupervised features to discover the environment influences in the process at 110 and utilize them in the process at 130. FIG. 6 also shows a strong correlation between Turbine 4, Turbine 6, and Turbine 7. The system may utilize this information in process 140 to improve prediction performance.

Figure 7:
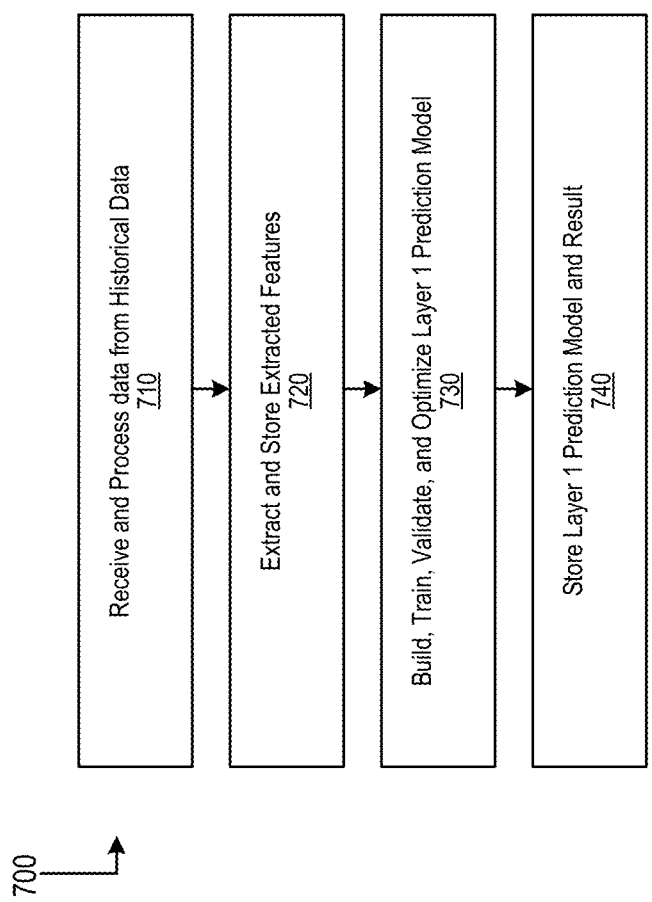
FIG. 7 is a flow diagram illustrating an example method and computing system for creating a layer 1 prediction model at a detailed level according to an example implementation.

FIG. 7 is a flow diagram illustrating an example method and computing system for creating layer 1 prediction model at a detailed level according to an example implementation. For example, the layer 1 prediction model may be built with historical weather forecasting data and historical wind power generation data to learn the wind power generation equation of wind turbines.

The method 700 includes receiving and processing historical data as shown at 710. Historical data may be time-series data, spatial data, temporal data, and/or spatial-temporal data. For example, historical data may involve five years of hourly historical data. Historical data may include, but is not limited to, time, wind power generation, wind speed, wind direction, and location. Historical data may be normalized and scaled to have values between 0 and 1 in accordance with the desired implementation.

At 720, the method 700 includes extracting features from historical data and storing extracted features for further usage in the processes of 120, 130 and 730 according to an example implementation. Extracted features from process 720 may include, but are not limited to, features such as "year", "month", "hour", wind speed ("ws"), and categorical wind direction ("wd").

The method 700 includes building, training, validating, and optimizing a layer 1 prediction model at 730. At 740, the method 700 also includes storing the layer 1 prediction model and result for further usage in the process at 130. For example, a layer 1 prediction model may be built to learn the wind power generation equation of wind turbines. Wind power is generated from the impact between wind and the blades of wind turbines. The rotating blades slow down the wind and convert wind speed to mechanical energy that drives rotor to generate electricity. The actual wind power generation ("wp") extracted from wind is proportional to cube of wind speed ("ws"). Considering the impact of wind direction ("wd"), the system may use the following formula to learn this relationship $$wp \sim wd^*(ws+ws^2+ws^3)$$

Since the relationship between wind direction and wind power is non-linear, the system may split the 360-degree wind direction into 8 categories and build a categorical representation of "wd". * means the interactions in linear regressions. The relation between wind forecasts and wind power generation is learnt by a linear model, whose output will be used in the process at 130.

Figure 8:
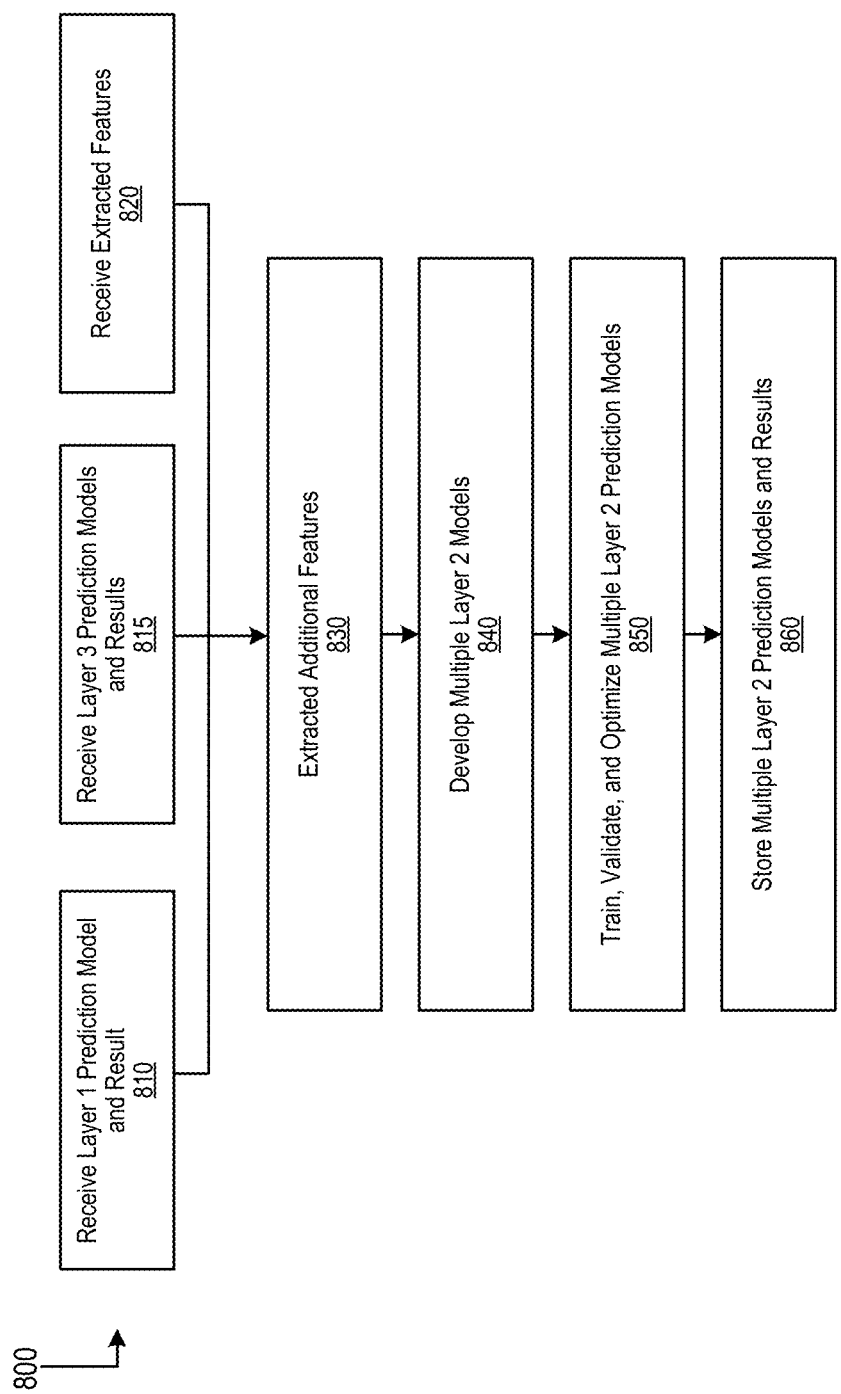
FIG. 8 is a flow diagram illustrating an example method and computing system for creating multiple layer 2 prediction models at a detailed level according to example implementations.

FIG. 8 is a flow diagram illustrating an example method and computing system for creating multiple layer 2 prediction models at a detailed level, according to an example implementation. For example, the system may create hundreds of layer 2 models that learn from different set of extracted features, output from layer 1 prediction model, and output of layer 3 hybrid prediction models and store for further usage in the process at 140.

At 810, the method 800 includes receiving layer 1 prediction models and results from the process at 740. Additionally, or alternatively, at 815 the method 800 may include receiving layer 3 prediction models and results from the process at 140. At 820, the method 800 also includes receiving extracted features from the process at 720. Further, the method 800 includes extracting additional features from the process at 830 based on data from the processes at 810, 815, and 820.

For example, there are many other kinds of information that can be essential for wind power prediction besides the wind speed and wind direction data. The process at 830 may take the layer 1 prediction result from the process at 810 as a new feature "wind" and extract additional features from other domains. Additionally, or alternatively, the process at 830 may take tree combinations of layer 3 hybrid model prediction results from the process at 815 as a new feature "hybrid1", "hybrid2", and "hybrid3"

The information captured by these features and models may include, but not limited to, (a) seasonal pattern, (b) time-series property, (c) historical observation, (d) recursive prediction, and (d) environmental influence.

In an example of a seasonal pattern based on the data example of FIG. 4, the system may detect that the wind has a variation according to the season of the year. The underlying reason is that the season may affect the temperature, wind speed, air density, and humidity, which may have an impact on the wind power generation. Since the wind power generation equation is based on wind speed, wind direction, and air density, seasonal features like month, day, and hour may express these factors indirectly. The system may extract and generate four kinds of seasonal features such as "year", "month", "day", and "hour". All features may be in numerical format and the feature "day"=|x−195| may represent the gap from July 15.

In an example of a time-series property, most machine learning models assume observations to have independent and identically distributed distribution. However, the temporal dependence of time-series data violates this assumption. For each timestamp, the system may integrate the "wind" feature with its previous m-hours data as "p1", "p2", "p3", "p4" to represent inertial behavior of wind turbines by capturing the temporal dependence in time-series observations.

In an example of the historical observation, the main purpose of time-series modeling is to forecast the future by studying the past observations. Statistical models use previous wind power observations to generate prediction over the next few hours. The prediction performance falls significantly as the forecasting horizon increases. Statistical models like auto regressive integrated moving average (ARIMA) and neural network models like long short-term memory (LSTM) are only good at small horizons. For larger horizons, the partial auto-correlation of wind power observation is small, as shown in FIGS. 5(a) to 5(c). The system may extract historical features "h1", "h2", "h3", "h4" for each horizon, representing the four most recent observations. "h1" is the observation 1 hours before, "h2" is the observation 2 hours before, "h3" is the observation 3 hours before, and "h4" is the observation 4 hours before. In addition, instead of an overall model for all forecasting horizons, training separate models with different historical features for each horizon may significantly improve the prediction performance.

Recursive prediction is another way to use historical data. Ordinary machine learning approaches train independent models for each horizon and perform prediction in parallel. Recursive prediction models are trained sequentially so that the predictors at adjacent horizons can help each other. Suppose the system want to forecast y using its past observation and feature x, the recursive model would be:

$$y_{t+1} = \alpha_0 + \alpha_1 y_t + \alpha_2 x_{t+1} + \epsilon_{t+1}$$

One step ahead prediction is $$\hat{y}_{t+1} = \hat{\alpha}_0 + \hat{\alpha}_1 y_t + \hat{\alpha}_2 x_{t+1}$$

Two steps ahead prediction is $$\hat{y}_{t+2} = \hat{\alpha}_0 + \hat{\alpha}_1 \hat{y}_{t+1} + \hat{\alpha}_2 x_{t+2}$$

The prediction models may be trained recursively at each horizon by including the previous output as the historical feature. This approach may provide performance improvement in the first 12 horizons.

With regards to locational influence, in addition to the supervised feature mentioned in the example above, the system may extract and generate unsupervised features to discover the locational influences in a non-explicit way to improve performance. The system may utilize k-means or k-medoids clustering algorithm to generate unsupervised features. For example, the system may utilize k-means clustering algorithm with k=20 to group wind power generation data into 20 clusters and use as a categorical feature "cluster".

At 840, the method 800 includes developing multiple layer 2 models based on extracted features and additional features from the processes at 810, 815, 820, and 830. The system may generate multiple models in the layer 2 with different combinations of features and different sets of training data. For example, the system may generate ten layer 2 models or hundreds of layer 2 models.

At 850, the method 800 includes training, validating, and optimizing multiple layer 2 prediction models base on a machine learning technique such as Support Vector Machines (SVM) or Gradient Boosting Regression. Some models may be trained separately at each wind turbine within a wind farm and/or 72 hourly prediction horizons, others may be trained as a single wind farm and/or all prediction horizons.

At 860, the method 800 also includes storing multiple layer 2 prediction models and results for further usage in the process at 140. For example, the system may store hundreds of layer 2 wind power generation prediction models. However, the selected ten models may be utilized further to create layer 3 hybrid prediction model according to one example implementation.

FIG. 9 illustrates an example of the extracted features and the additional features from the processes at 720, 810, 815, 820, and 830, in accordance with an example implementation. Each feature can be associated with a description, a type of value, and a range for the value, which can be utilized by the processes as described herein.

FIG. 10 illustrates ten examples of layer 2 models and associated features developed in the process at 840, in accordance with an example implementation. All of layer 2 models are utilizing a feature "wind" which is output from layer 1 model as an input. As illustrated in FIG. 10, each layer 2 model that is generated is associated with features listed in model structures column.

Figure 11:
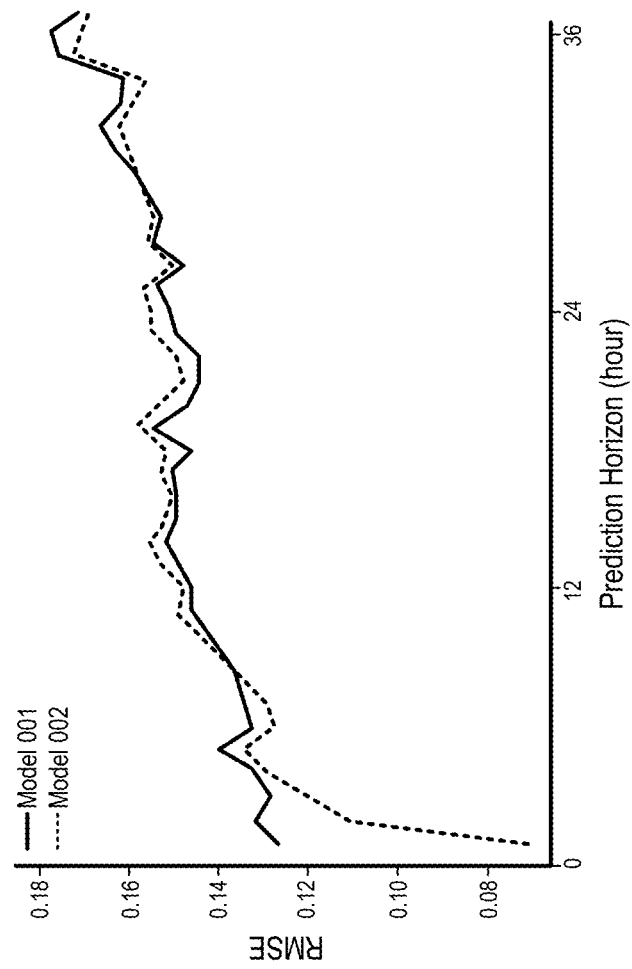
FIG. 11 illustrates an example of prediction performance of two layer 2 models, in accordance with an example implementation.

FIG. 11 illustrates an example of prediction performance of two layer 2 models developed by the method of FIG. 8, in accordance with an example implementation. In the example of FIG. 11, Model 001 provides a lower root mean square error (RMSE) between a 12 to 24 hours prediction horizon, while Model 002 provides a much lower RMSE in the first few hours of prediction horizon.

Figure 12:
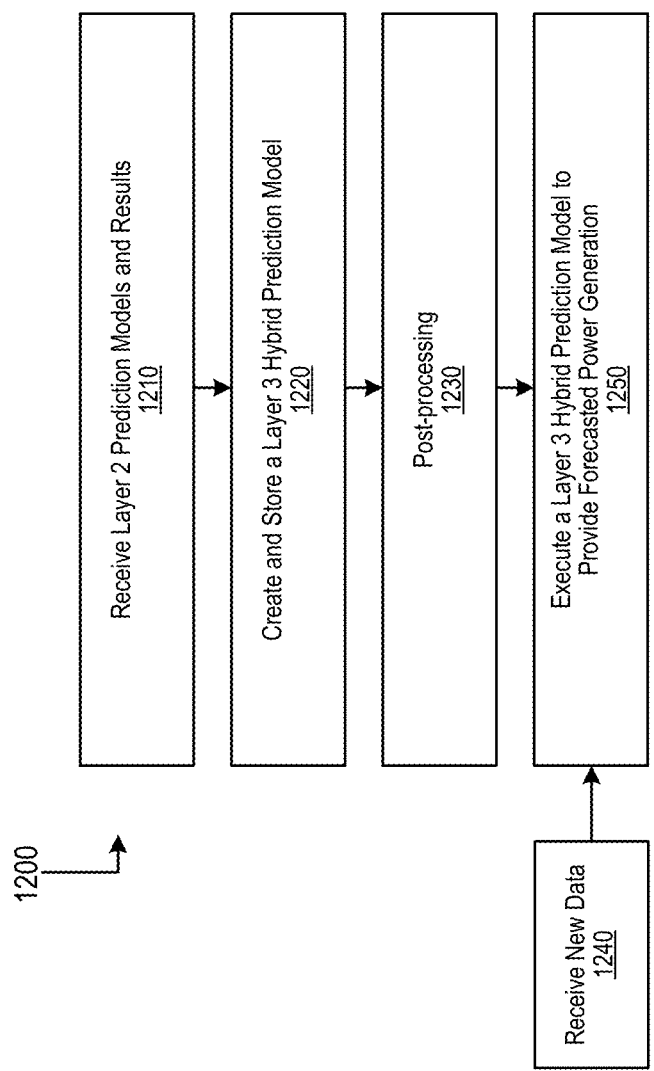
FIG. 12 is a flow diagram illustrating an example method and computing system for creating and executing layer 3 hybrid prediction model at a detailed level according to an example implementation.

FIG. 12 is a flow diagram illustrating an example method and computing system for creating and executing layer 3 hybrid prediction model at a detailed level, according to an example implementation. Since no individual prediction approach can capture all the information, the system may create a hybrid layer 3 prediction model to combine the knowledge learnt by multiple layer 2 models. For example, the system may create a layer 3 hybrid prediction model from selected ten of layer 2 prediction models to achieve better prediction performance compared to any single layer 2 model.

At 1210, the method 1200 includes receiving multiple layer 2 prediction models and results from the process at 860.

At 1220, the method 1200 includes creating and storing a layer 3 hybrid prediction model. Layer 2 models with different combination of features show different performance at each prediction horizon as shown in FIG. 11. The system may include, but is not limited to, three varieties of hybrid model to learn a hybrid ensemble model such as (a) choose best, (b) simple average, or (c) stacked regression.

In the example of choose best, the ensemble model may be obtained by combining experts at different prediction horizons. Based on the prediction performance on validation set, a hybrid model may be formed by choosing the best model over prediction horizon. Based on FIG. 11 as an example, Model 001 provides a lower RMSE between a 12 to 24 hours prediction horizon while Model 002 performs much better in the first few hours of prediction horizon. A hybrid model is formed by choosing Model 001 at 12 to 24 hours prediction horizons and Model 002 at 1 to 11 hours prediction horizons.

In an example of simple average, the ensemble model may be obtained by averaging the predictions of multiple models to reduce variance among multiple models.

In an example of stacked regression, suppose the system has a set of predictors $f_1(x), f_2(x), \ldots, f_K(x)$, instead of selecting one from the set, a more accurate predictor can be obtained by combining them. The system may restrict attention to linear combinations $$f(x) = \sum_{k=1}^{K} \alpha_k f_k(x)$$

In the simple average approach, $$\alpha_k = \frac{1}{K}$$

in a constant. Given samples $\{(x_n, y_n), n=1, \ldots, N\}$, the system can learn the coefficient $\alpha_k$ to minimize $$\sum_{n=1}^{N} \left( y_n - \sum_{k=1}^{K} \alpha_k f_k(x) \right)^2$$

Additionally, the process at 1220 may create and store multiple layer 3 hybrid prediction models based on different combinations of selected layer 2 models, and provide output back to the process at 130. For example, the system may create five layer 3 models based on five combinations of different selection of layer 2 prediction models. The outputs from five layer 3 prediction models may be utilized as additional features to create additional layer 2 models.

The method 1200 includes post-processing at 1230. The system may include smoothing and parameters-tuning as part of post-processing after the process at 1220 to further improve performance of a hybrid model. For example, FIG. 6 shows a strong correlation between Turbine 4, 6, and 7. The system may smooth the output of the predictions to reduce the prediction error. Denote $(y_4, y_6, y_7)$ as the raw prediction vector for turbine 4, 6, and 7. The vector after smoothing is the weighted average $(y_4, y_6, y_7)*(a_1, a_2, a_3)^T$.

The smoothing coefficient matrix $(a_1, a_2, a_3)$ may be learnt by linear regression on a validation set.

In addition, the system may conduct smoothing on the time sequence. For example, the system may use average of a three-hour window size to smooth the predictions.

At 1250, the method 1200 includes executing a layer 3 hybrid prediction model with new data from the process at 1240 to provide predicted wind power generation that can be utilized by utilities to optimize operation planning to ensure economic and stable operation of the electricity.

Figure 13:
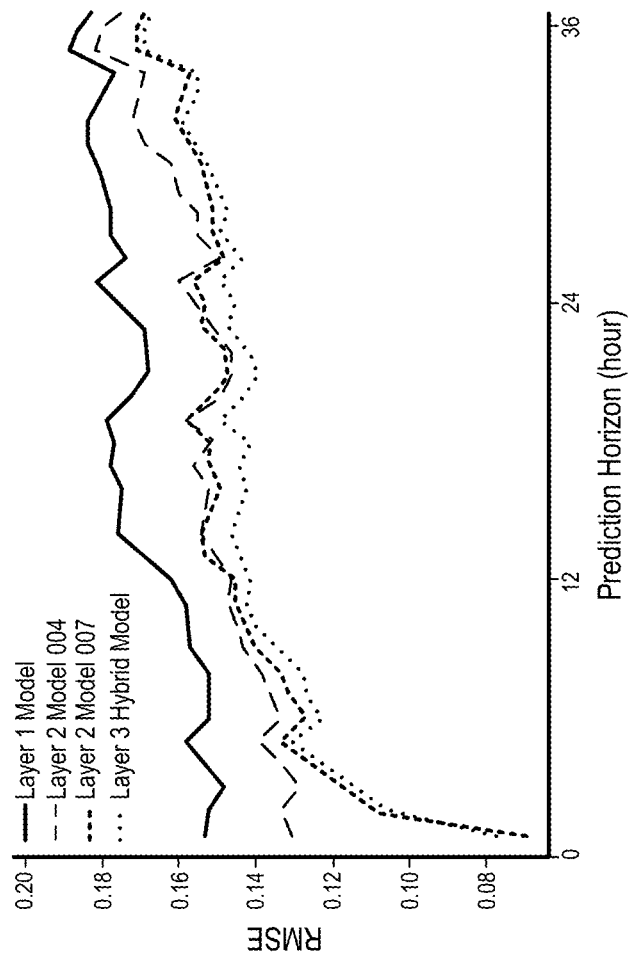
FIG. 13 illustrates corresponding examples of forecasting performance from several models, in accordance with an example implementation.

FIG. 13 illustrates corresponding example of forecasting performance from several models developed through the flow diagram of FIG. 1 over approximately 36 hourly prediction horizons, in accordance with an example implementation. FIG. 13 shows that a layer 3 hybrid model developed according to an example implementation outperforms layer 2 model 004, layer 2 model 007, and layer 1 model.

Figure 14:
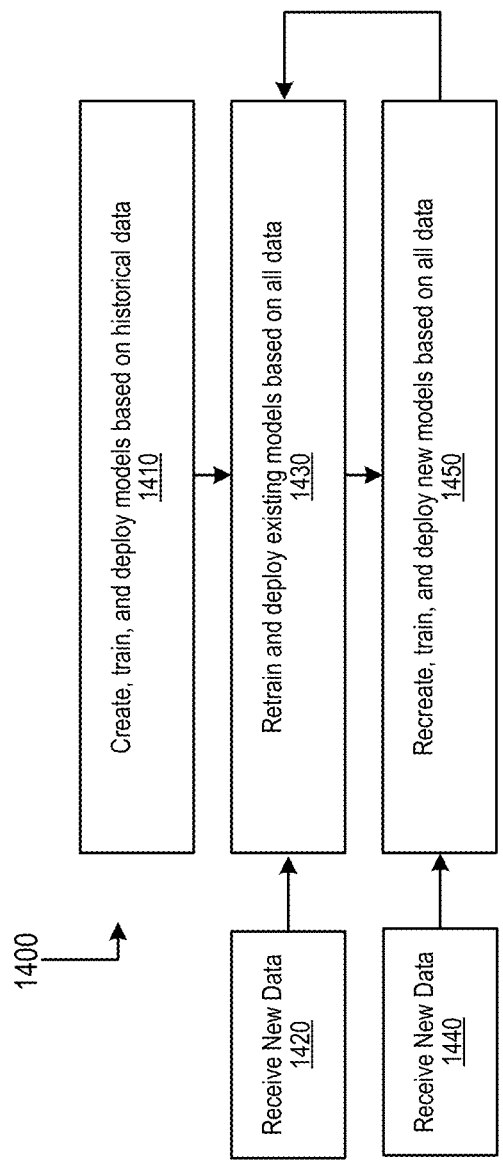
FIG. 14 is a flow diagram illustrating an example process for method and computing system during production phase according to an example implementation.

FIG. 14 is a flow diagram illustrating an example process for method and computing system during production phase according to an example implementation. Because the system may receive additional data which contain additional information during production phase, the system may retrain, recreate, and deploy existing models and/or new models to achieve better performance continuously.

At 1410, the method 1400 includes creating, training, and deploying models based on historical data. For example, at an initial stage, the system may have only one year of historical data to create, train, and deploy models. The system may not be able to capture variation in year to year pattern of data.

The method 1400 includes receiving new data at 1420, and retraining and deploying existing models based on all data at 1430. For example, the system may acquire new data after three months in production. The system may retrain the existing models from the process at 1420 with a total of fifteen months of data. The system may compare the performance with the process at 1410, then the system may deploy a trained model that provide the best performance.

The method 1400 includes receiving new data at 1440, and recreating, training, and deploying new models based on all data at 1450. For example, the system may acquire new data after one year in production. The system may recreate and train new models with a total of two years of data which contain additional year to year pattern. The system may compare performance of the processes at 1410, 1430, and 1450, then the system may deploy trained models that provide the best performance.

Through the example implementations described herein, it is thereby possible to generate multi-layer hybrid models to predict wind power generation for short-term planning. Short-term planning by utilities facing challenges from intermittent nature and high variability of wind power generation can thereby optimize operation planning to ensure economic and stable operation of the electricity.

In example implementations, there are systems and methods for generating a multi-layer hybrid model power generation prediction at high level to provide predicted wind power generation. Such systems and methods can involve receiving, processing, and extracting features from historical data, creating a layer 1 prediction model, creating multiple layer 2 prediction models based on extracted features, an output of layer 1 model, layer 3 models, and additional extracted features, and creating layer 3 hybrid prediction model based on output of a selection of layer 2 models. Alternatively, example implementations can create multiple layer 3 hybrid prediction models based on different combination of selected layer 2 models and provide output back to create additional layer 2 models.

Example implementations can involve executing a layer 3 hybrid prediction model based on new data to provide prediction of the wind power generation that can be utilized for economic and stable operation of the electricity.

In example implementations there are systems and methods for creating and storing a layer 1 prediction model, which can involve receiving and processing historical data, extracting features from historical data, storing extracted features for further usage, building, training, validating, and optimizing the layer 1 prediction model, and storing the layer 1 prediction model for further usage.

In example implementations, there are systems and methods for creating layer 2 prediction models, which can involve receiving the layer 1 prediction models and results (or, additionally, receiving the layer 3 prediction models and results), receiving extracted features, extracting additional features, developing multiple layer 2 models based on extracted features and additional features, training, validating, and optimizing multiple layer 2 prediction models, and storing multiple layer 2 prediction models and results.

In example implementations, there are systems and methods for creating a layer 3 hybrid prediction model, which can involve receiving multiple layers 2 prediction models and results, creating and storing a layer 3 hybrid prediction model (or alternatively, creating and storing multiple layer 3 hybrid prediction models), post-processing with smoothing and hyper-parameters tuning, receiving new data, and executing a layer 3 hybrid prediction model to provide predicted wind power generation.

In example implementations, there are systems and methods as implemented during the production phase, which can involve creating, training, and deploying models based on historical data, receiving new data, retraining and deploying existing models based on all data, receiving new data, and recreating, training, and deploying new models based on all data.

Figure 15:
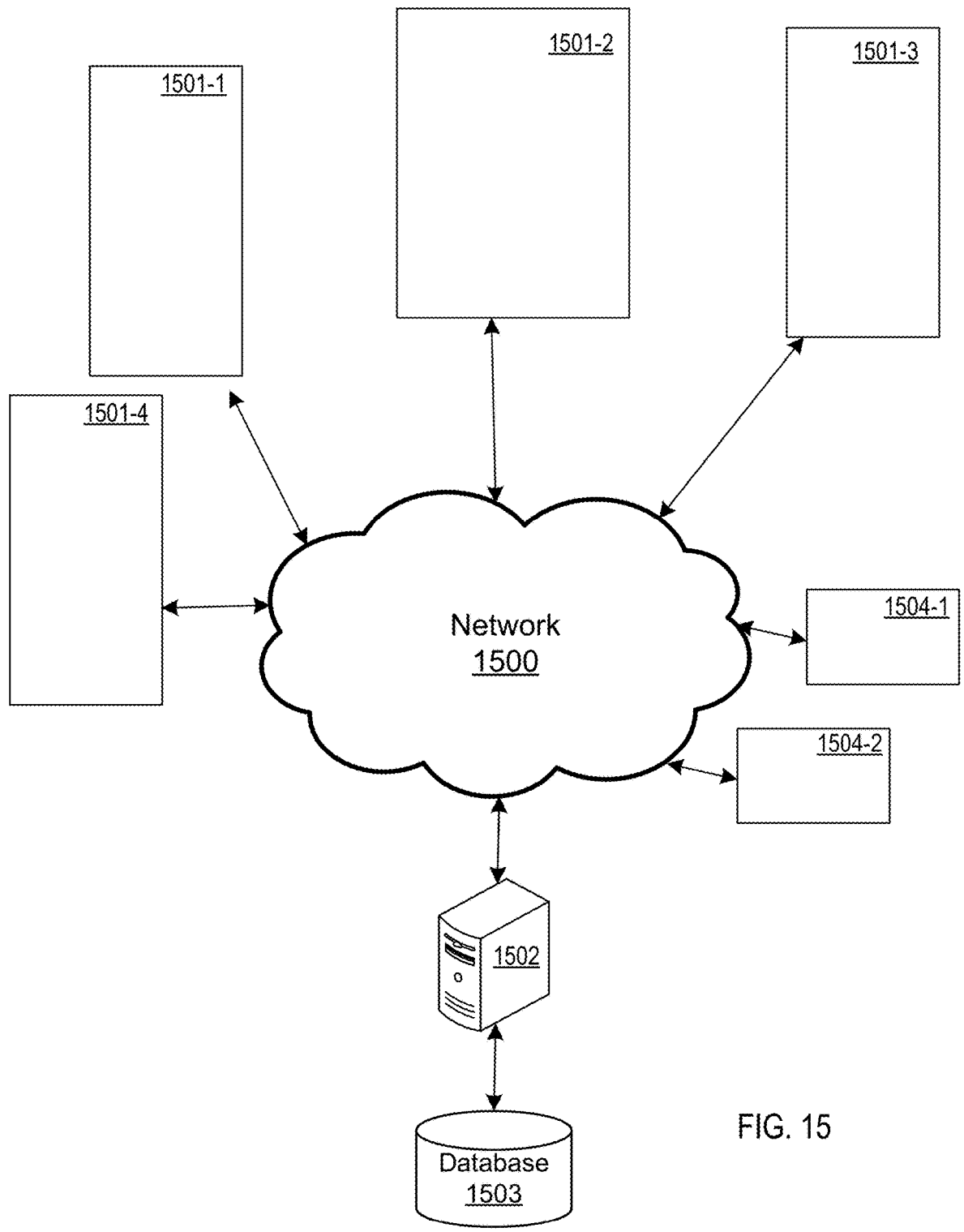
FIG. 15 illustrates a system involving a plurality of renewable energy systems and a management apparatus, in accordance with an example implementation.

FIG. 15 illustrates a system involving a plurality of renewable energy systems and a management apparatus, in accordance with an example implementation. One or more renewable energy systems 1501-1, 1501-2, 1501-3, and 1501-4 are communicatively coupled to a network 1500 which is connected to a management apparatus 1502. One or more weather forecasting systems 1504-1 and 1504-2 are communicatively coupled to a network 1500 which is connected to a management apparatus 1502. The management apparatus 1502 manages a database 1503, which contains historical data collected from the renewable energy systems and weather forecasting systems in the network 1500. In alternate example implementations, the data from the renewable energy systems 1501-1, 1501-2, 1501-3, and 1501-4 and weather forecasting systems 1504-1 and 1504-2 can be stored to a central repository or central database such as proprietary databases that intake data such as enterprise resource planning systems, and the management apparatus 1502 can access or retrieve the data from the central repository or central database. Such renewable energy systems can include wind farms operating a plurality of turbines, solar farms operating a plurality of solar panels, and so on in accordance with the desired implementation. Such renewable energy systems can involve sensors to provide sensor data to the management apparatus 1502.

Figure 16:
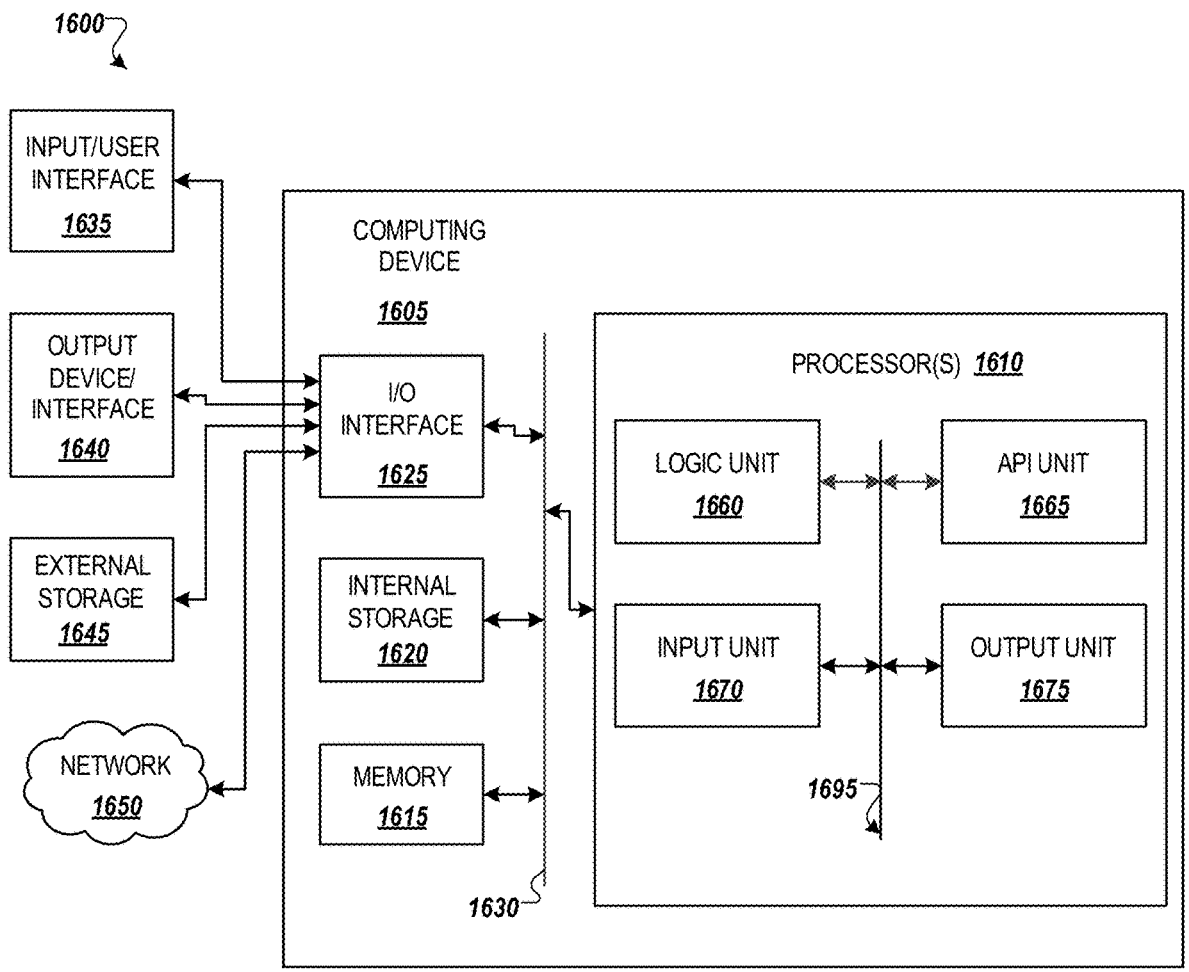
FIG. 16 illustrates an example computing environment with an example computer device suitable for use in some example implementations.

FIG. 16 illustrates an example computing environment with an example computer device suitable for use in some example implementations, such as a management apparatus 1502 as illustrated in FIG. 15. Computer device 1605 in computing environment 1600 can include one or more processing units, cores, or processors 1610, memory 1615 (e.g., RAM, ROM, and/or the like), internal storage 1620 (e.g., magnetic, optical, solid state storage, and/or organic), and/or 10 interface 1625, any of which can be coupled on a communication mechanism or bus 1630 for communicating information or embedded in the computer device 1605. IO interface 1625 is also configured to receive images from cameras or provide images to projectors or displays, depending on the desired implementation.

Computer device 1605 can be communicatively coupled to input/user interface 1635 and output device/interface 1640. Either one or both of input/user interface 1635 and output device/interface 1640 can be a wired or wireless interface and can be detachable. Input/user interface 1635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1640 may include a display, television, monitor, printer, speaker, braille, or the like. In some example implementations, input/user interface 1635 and output device/interface 1640 can be embedded with or physically coupled to the computer device 1605. In other example implementations, other computer devices may function as or provide the functions of input/user interface 1635 and output device/interface 1640 for a computer device 1605.

Examples of computer device 1605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1605 can be communicatively coupled (e.g., via IO interface 1625) to external storage 1645 and network 1650 for communicating with any number of networked components, devices, and systems, including one or more computer devices of the same or different configuration. Computer device 1605 or any connected computer device can be functioning as, providing services of, or referred to as a server, client, thin server, general machine, special-purpose machine, or another label.

IO interface 1625 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1600. Network 1650 can be any network or combination of networks (e.g., the Internet, local area network, wide area network, a telephonic network, a cellular network, satellite network, and the like).

Computer device 1605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1610 can execute under any operating system (OS) (not shown), in a native or virtual environment. One or more applications can be deployed that include logic unit 1660, application programming interface (API) unit 1665, input unit 1670, output unit 1675, and inter-unit communication mechanism 1695 for the different units to communicate with each other, with the OS, and with other applications (not shown). The described units and elements can be varied in design, function, configuration, or implementation and are not limited to the descriptions provided. Processor(s) 1610 can be in the form of hardware processors such as central processing units (CPUs) or in a combination of hardware and software units.

In some example implementations, when information or an execution instruction is received by API unit 1665, it may be communicated to one or more other units (e.g., logic unit 1660, input unit 1670, output unit 1675). In some instances, logic unit 1660 may be configured to control the information flow among the units and direct the services provided by API unit 1665, input unit 1670, output unit 1675, in some example implementations described above. For example, the flow of one or more processes or implementations may be controlled by logic unit 1660 alone or in conjunction with API unit 1665. The input unit 1670 may be configured to obtain input for the calculations described in the example implementations, and the output unit 1675 may be configured to provide output based on the calculations described in example implementations.

Processor(s) 1610 can be configured to generate a multi-layer hybrid model power generation prediction, by extracting features from historical data of one or more renewable energy systems and one or more weather forecasting systems as illustrated at 110 of FIG. 1; generating a layer 1 prediction model from the extracted features as illustrated at 120 of FIG. 1; generating a plurality of layer 2 prediction models based on one or more of an output from the layer 1 prediction model, an output from layer 3 prediction models, and the extracted features as illustrated at 130 of FIG. 1; generating the at least one layer 3 hybrid prediction model based on an output of a selection of layer 2 prediction models from the plurality of layer 2 prediction models as illustrated in 140 of FIG. 1; and executing the at least one layer 3 hybrid prediction model on new data received from the one or more renewable energy systems and one or more weather forecasting systems to provide prediction on power generation of the one or more renewable energy systems as illustrated at 150 and 160 of FIG. 1.

Processor(s) 1610 are configured to generate the at least one layer 3 hybrid prediction model by generating multiple layer 3 hybrid prediction models based on different combinations of the selected layer 2 models, wherein an output of the at least one layer 3 hybrid prediction model is provided to generate additional layer 2 models as illustrated in FIG. 1. and FIG. 12.

Processor(s) 1610 are configured to generate the layer 1 prediction model from the extracted features by extracting the extracted features from historical data of the one or more renewable energy systems and one or more weather forecasting systems; building the layer 1 prediction model from the extracted features, and executing a training and validation process on the layer 1 prediction model as illustrated in FIG. 7.

Processor(s) 1610 can be configured to generate the plurality of layer 2 prediction models based on one or more of the output from the layer 1 prediction model, the output from layer 3 prediction models, and the extracted features by extracting additional features from one or more of the output from the layer 1 prediction model and the extracted features; generating, from the layer 1 prediction model and the output from the layer 1 prediction model, the plurality of layer 2 prediction models based on the extracted features and the additional features; and executing a training and validation process on the plurality of layer 2 prediction models as illustrated in FIG. 8.

Processor(s) 1610 can be configured to generate the plurality of layer 2 prediction models based on one or more of the output from the layer 1 prediction model, the output from layer 3 prediction models, and the extracted features by extracting additional features from one or more of the output from the layer 1 prediction model and the extracted features; generating, from the layer 3 prediction models and the output from the layer 3 prediction models, the plurality of layer 2 prediction models based on the extracted features and the additional features; and executing a training and validation process on the plurality of layer 2 prediction models as illustrated in FIG. 8.

Processor(s) 1610 can be configured to generate the at least one layer 3 hybrid prediction model based on the output of the selection of the layer 2 prediction models from the plurality of layer 2 prediction models by generating the at least one layer 3 hybrid prediction model from the selection of the layer 2 prediction models and the output of the selection of the layer 2 prediction models; and executing post-processing comprising a smoothing process and a hyper-parameters tuning process on the at least one layer 3 hybrid prediction as illustrated in FIG. 12.

During the application phase, processor(s) 1610 can be configured to receive data from the one or more renewable energy systems and one or more weather forecasting systems as illustrated in FIG. 15 and FIG. 1; extract features from the data from the one or more renewable energy systems and one or more weather forecasting systems as illustrated in FIG. 1; and execute the layer 3 hybrid prediction model to provide prediction on power generation of the one or more renewable energy systems as illustrated at 160 of FIG. 1. In an example implementation of the execution of the layer 3 hybrid prediction model, processor(s) 1610 can be configured to execute a layer 1 prediction model on the extracted features to generate a first output; execute a plurality of layer 2 prediction models on the output from the layer 1 prediction model and the extracted features; and provide output from the plurality of layer 2 prediction models to a layer 3 hybrid prediction model to provide prediction on power generation of the one or more renewable energy systems.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for generating a multi-layer hybrid model power generation prediction, comprising:
   extracting features from historical data of one or more renewable energy systems;
   generating a layer 1 prediction model from the extracted features;
   generating a plurality of layer 2 prediction models based on combination of an output from the layer 1 prediction model, an output from layer 3 prediction models, and the extracted features;
   generating the at least one layer 3 hybrid prediction model based on an output of a selection of layer 2 prediction models from the plurality of layer 2 prediction models; and
   executing the at least one layer 3 hybrid prediction model on new data received from the one or more renewable energy systems to provide prediction on power generation of the one or more renewable energy systems,
   wherein the generating the at least one layer 3 hybrid prediction model based on the output of the selection of the layer 2 prediction models from the plurality of layer 2 prediction models comprises:
      generating the at least one layer 3 hybrid prediction model from the selection of the layer 2 prediction models and the output of the selection of the layer 2 prediction models; and
      executing post-processing comprising a smoothing process and a hyper-parameters tuning process on the at least one layer 3 hybrid prediction model.

2. The method of claim 1, wherein the generating the at least one layer 3 hybrid prediction model comprise generating multiple layer 3 hybrid prediction models based on different combinations of the selected layer 2 models, wherein an output of the at least one layer 3 hybrid prediction model is provided to generate additional layer 2 models.

3. The method of claim 1, wherein the generating the layer 1 prediction model from the extracted features comprises:
   extracting the extracted features from historical data of the one or more renewable energy systems;
   building the layer 1 prediction model from the extracted features,
   executing a training and validation process on the layer 1 prediction model.

4. The method of claim 1, wherein the generating the plurality of layer 2 prediction models based on one or more of the output from the layer 1 prediction model, the output from layer 3 prediction models, and the extracted features comprises:
   extracting additional features from one or more of the output from the layer 1 prediction model and the extracted features;
   generating, from the layer 1 prediction model and the output from the layer 1 prediction model, the plurality of layer 2 prediction models based on the extracted features and the additional features; and
   executing a training and validation process on the plurality of layer 2 prediction models.

5. The method of claim 1, wherein the generating the plurality of layer 2 prediction models based on one or more of the output from the layer 1 prediction model, the output from layer 3 prediction models, and the extracted features comprises:
   extracting additional features from one or more of the output from the layer 1 prediction model and the extracted features;
   generating, from the layer 3 prediction models and the output from the layer 3 prediction models, the plurality of layer 2 prediction models based on the extracted features and the additional features; and
   executing a training and validation process on the plurality of layer 2 prediction models.

6. A non-transitory computer readable medium, storing instructions for generating a multi-layer hybrid model power generation prediction, comprising:
   extracting features from historical data of one or more renewable energy systems;
   generating a layer 1 prediction model from the extracted features;
   generating a plurality of layer 2 prediction models based on a combination of an output from the layer 1 prediction model, an output from layer 3 prediction models, and the extracted features;
   generating the at least one layer 3 hybrid prediction model based on an output of a selection of layer 2 prediction models from the plurality of layer 2 prediction models; and
   executing the at least one layer 3 hybrid prediction model on new data received from the one or more renewable energy systems to provide prediction on power generation of the one or more renewable energy systems,
   wherein the generating the at least one layer 3 hybrid prediction model based on the output of the selection of the layer 2 prediction models from the plurality of layer 2 prediction models comprises:
      generating the at least one layer 3 hybrid prediction model from the selection of the layer 2 prediction models and the output of the selection of the layer 2 prediction models; and
      executing post-processing comprising a smoothing process and a hyper-parameters tuning process on the at least one layer 3 hybrid prediction model.

7. The non-transitory computer readable medium of claim 6, wherein the generating the at least one layer 3 hybrid prediction model comprise generating multiple layer 3 hybrid prediction models based on different combinations of the selected layer 2 models, wherein an output of the at least one layer 3 hybrid prediction model is provided to generate additional layer 2 models.

8. The non-transitory computer readable medium of claim 6, wherein the generating the layer 1 prediction model from the extracted features comprises:
   extracting the extracted features from historical data of the one or more renewable energy systems;
   building the layer 1 prediction model from the extracted features; and
   executing a training and validation process on the layer 1 prediction model.

9. The non-transitory computer readable medium of claim 6, wherein the generating the plurality of layer 2 prediction models based on one or more of the output from the layer 1 prediction model, the output from layer 3 prediction models, and the extracted features comprises:
   extracting additional features from one or more of the output from the layer 1 prediction model and the extracted features;
   generating, from the layer 1 prediction model and the output from the layer 1 prediction model, the plurality of layer 2 prediction models based on the extracted features and the additional features; and executing a training and validation process on the plurality of layer 2 prediction models.

10. The non-transitory computer readable medium of claim 6, wherein the generating the plurality of layer 2 prediction models based on one or more of the output from the layer 1 prediction model, the output from layer 3 prediction models, and the extracted features comprises:
    extracting additional features from one or more of the output from the layer 1 prediction model and the extracted features;
    generating, from the layer 3 prediction models and the output from the layer 3 prediction models, the plurality of layer 2 prediction models based on the extracted features and the additional features; and
    executing a training and validation process on the plurality of layer 2 prediction models.

11. An apparatus communicatively coupled to one or more renewable energy systems, the apparatus, comprising:
    a processor, configured to:
        receive data from the one or more renewable energy systems;
        extract features from the data from the one or more renewable energy systems;
        execute a layer 1 prediction model to generate a first output;
        execute a plurality of layer 2 prediction models on the output from the layer 1 prediction model, the extracted features, and the additional features; and
        provide output from the plurality of layer 2 prediction models to a layer 3 hybrid prediction model to provide prediction on power generation of the one or more renewable energy systems,
    wherein the layer 3 hybrid prediction model is generated based on an output of a selection of layer 2 prediction models from the plurality of layer 2 prediction models, and
    wherein a post-processing comprising a smoothing process and a hyper-parameters tuning process is executed on the layer 3 hybrid prediction model.

* * * * *